United States Patent
Student et al.

(10) Patent No.: US 11,505,707 B2
(45) Date of Patent: Nov. 22, 2022

(54) FIRE-PROTECTION COMPOSITION, MULTI-COMPONENT SYSTEM AND USE OF THE SAME

(71) Applicant: Hilti Aktiengesellschaft, Schaan (LI)

(72) Inventors: Katja Student, Augsburg (DE); Jekaterina Miller, Ostfildern (DE); Phillip Jochmann, Ulm (DE); Stefan Schlenk, Landsberg (DE); Richard Spedding, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 452 days.

(21) Appl. No.: 16/604,217

(22) PCT Filed: May 24, 2018

(86) PCT No.: PCT/EP2018/063592
§ 371 (c)(1),
(2) Date: Oct. 10, 2019

(87) PCT Pub. No.: WO2018/224317
PCT Pub. Date: Dec. 13, 2018

(65) Prior Publication Data
US 2020/0157361 A1 May 21, 2020

(30) Foreign Application Priority Data
Jun. 6, 2017 (EP) .................................. 17174478

(51) Int. Cl.
| C09D 5/18 | (2006.01) |
| C09D 5/02 | (2006.01) |
| C09D 171/00 | (2006.01) |
| C09D 175/04 | (2006.01) |
| C08G 65/336 | (2006.01) |
| C08G 18/71 | (2006.01) |
| C08K 3/32 | (2006.01) |
| C08K 5/3492 | (2006.01) |

(52) U.S. Cl.
CPC ............... *C09D 5/18* (2013.01); *C09D 5/021* (2013.01); *C09D 5/185* (2013.01); *C09D 171/00* (2013.01); *C09D 175/04* (2013.01); *C08G 18/718* (2013.01); *C08G 65/336* (2013.01); *C08K 5/34922* (2013.01); *C08K 2003/323* (2013.01)

(58) Field of Classification Search
CPC .................................. C09D 5/18; C09D 5/185
See application file for complete search history.

(56) References Cited

U.S. PATENT DOCUMENTS

| 9,181,454 | B2 | 11/2015 | Brooks et al. | |
| 2012/0174508 | A1 | 7/2012 | Brooks et al. | |
| 2015/0284611 | A1 | 10/2015 | Thiemann et al. | |
| 2016/0040069 | A1 | 2/2016 | Brooks et al. | |
| 2016/0168393 | A1* | 6/2016 | Kreh ........................ | C09D 5/185 427/407.1 |
| 2017/0121536 | A1 | 5/2017 | Marauska et al. | |
| 2019/0100662 | A1* | 4/2019 | Gottumukkala ....... | C09D 5/185 |
| 2019/0264080 | A1 | 8/2019 | Thiemann et al. | |

FOREIGN PATENT DOCUMENTS

| EP | 2 955 209 | | 12/2015 |
| RU | 2299229 | | 5/2007 |
| WO | 2010/131037 | | 11/2010 |
| WO | WO 2014/080000 | A1 * | 5/2014 |
| WO | 2014/095834 | | 6/2014 |
| WO | WO 2018/087315 | * | 5/2018 |

OTHER PUBLICATIONS

Pentaerythrite product page from Made-In-China website url: https://www.made-in-china.com/showroom/viviaaa/product-detailtoUmzIQxjXcE/China-Pentaerythrite.html.*
International Search Report dated Jul. 17, 2018 in PCT/EP2018/063592 with English translation.
Written Opinion dated Jul. 17, 2018 in PCT/EP2018/063592.

* cited by examiner

*Primary Examiner* — Marc S Zimmer
(74) *Attorney, Agent, or Firm* — Grüneberg and Myers PLLC

(57) ABSTRACT

A fire protection composition contains a binder on the basis of an alkoxysilane-functionalized polymer and a liquid carbon supplier. The fire protection composition allows application in a simple and rapid manner of coatings having the layer thickness required for the particular fire resistance time, the layer thickness being reduced to a minimum while achieving a good fireproofing effect. The fire-protection composition is formulated as a multi-component system. The fire-protection composition is particularly suitable for fire protection, especially as a coating of construction elements such as steel carriers.

14 Claims, No Drawings

FIRE-PROTECTION COMPOSITION, MULTI-COMPONENT SYSTEM AND USE OF THE SAME

CROSS-REFERENCE TO RELATED APPLICATIONS

This application is a National Stage entry under § 371 of International Application No. PCT/EP2018/063592, filed on May 24, 2018, and which claims the benefit of European Application No. 17174478.2, filed on Jun. 6, 2017, the content of each of which is incorporated by reference in their entirety.

BACKGROUND OF THE INVENTION

Field of the Invention

The present invention relates to a fire-protection composition with intumescent properties, which contains a binder based on a polymer that carries alkoxy-functionalized silane groups, to a multi-component system containing this fire-protection composition, as well as to the use of the same for fire protection, especially for coatings on building parts, such as columns, beams or truss members, in order to increase the fire-resistance duration.

Discussion of the Background

Insulating-layer-forming compositions, also known as intumescent compositions, are usually applied for formation of coatings on the surface of building parts, in order to protect these from fire or against the effect of intense heat, for example as a consequence 25 of a fire.

Various systems for this purpose exist in the prior art. For the most part, a distinction is made between 100% systems and solvent-based or water-based systems.

The systems based on solvents or water have the disadvantage that the drying times, also known as curing times, are long and in addition several layers must be applied, and so they need several work cycles to attain the necessary layer thickness. Since each individual layer must be appropriately dried prior to application of the next layer, this leads to a large expenditure of working time and accordingly high costs and to a delay in completion of the building structure, due to the fact that—depending on weather conditions—several days may sometimes elapse until the necessary layer thickness has been applied. Another disadvantage is that, due to the necessary layer thickness, the coating may tend to cracking and flaking during drying or if exposed to the effect of heat, whereby the underlying surface becomes partly exposed in the worst case, especially in systems in which the binder does not undergo post-curing after evaporation of the solvent or of the water. In many cases, the resulting layers must be covered or protected in some other form.

In order to circumvent this disadvantage, two-component or multi-component systems have been developed that work effectively almost without solvent, so that curing takes place substantially more rapidly and in addition thicker layers may be applied in one work cycle, and so the necessary layer thickness is built up substantially more rapidly.

From WO 2010/131037 A1 and the further Applications derived from it, a composition is known that is based on silane-terminated polyurethanes or silane-terminated ethers as binders, containing plasticizers compatible therewith and containing intumescent additives. Furthermore, packaging of the composition in two components is described, wherein the silane-terminated prepolymer is contained in a first component and, separated therefrom, the intumescent ingredient and the plasticizer are contained in a second component. The purpose of this is to avoid the need to dry the ingredients contained in the second component, since only the prepolymer is contained in the first component, which is intended to lead to better storage stability.

The inventors have found that the composition described in WO 2010/131037 A1, because of the relatively high viscosity, is difficult to spray in the absence of a plasticizer, and that the composition has reduced storage stability when the intumescent mixture is packaged together with the polymer. A further disadvantage is that health-damaging and/or volatile organic compounds (VOC) are introduced by the plasticizer into the composition.

From WO 14/079873 A1, a two-component or multi-component insulating-layer-forming composition is known that contains a binder based on a silane-functionalized polymer, water as cross-linking agent and a dehydrogenation catalyst as the intumescent mixture, a blowing agent and optionally a carbon source, wherein the polymer and the cross-linking agent are stored separated from one another in different components and the intumescent mixture together with the polymer is contained in one component. A disadvantage of the composition is that the storage stability is impaired when the intumescent mixture and the polymer are stored together in one component.

SUMMARY OF THE INVENTION

The object underlying the invention is therefore to create an insulating-layer-forming coating system of the type mentioned in the introduction, which avoids the said disadvantages, which is particularly stable during storage and which has good sprayability even without the use of a plasticizer.

This object is solved by the fire-protection composition according to an embodiment and the multi-component system according to another embodiment. Preferred embodiments can be found as further embodiments.

The inventors have found that, due to the presence of the carbon sources used in the intumescent compositions, i.e. compounds that have hydroxyl groups or hydroxyl-group-forming groups in the component in which the alkoxysilane-functionalized polymer is also contained, the storage stability of the composition is greatly reduced.

A particular advantage of the inventive fire-protection composition, which is derived due to the use of liquid carbon sources, is the reduction of the viscosity of the mixture after mixing of the ingredients of the fire-protection composition, to the effect that plasticizers may be dispensed with. Due to the low viscosity, even in case of a high proportion of solids, the composition remains easy to process, especially by common spraying methods.

A further advantage of the inventive fire-protection composition, which is achieved by dispensing with plasticizers, is the minimized exposure of people and the environment to volatile organic compounds (VOC). Accordingly, this is an advantage compared with the solvent-based systems.

An advantage—which is achieved in particular by packaging as a multi-component system—of the separation of binder and carbon source and thus of the separation of the binder from the compounds that have hydroxyl groups or hydroxyl-group-forming groups, is very good storage stability.

DETAILED DESCRIPTION OF THE INVENTION

For better understanding of the invention, the following explanations of the terminology used herein are considered to be useful. Within the meaning of the invention:

"polyol" means a compound that contains more than one hydroxyl group (—OH), in other words polyalcohol (multihydric alcohol), wherein the compound may have both linear, branched and even cyclic structure;

"chemical intumescence" means the formation of a voluminous insulating ash layer by compounds that are matched to one another and that react with one another under the effect of heat;

"physical intumescence" means the formation of a voluminous insulating layer by swelling of a compound, which releases gases under the effect of heat, even though no chemical reaction has occurred between two compounds, whereby the volume of the compound increases by a multiple of the original volume;

"insulation-laver-forming" means that, in the fire situation, a solid microporous carbon foam is produced, so that the resulting finely porous and thick foam layer, the so-called ash crust, insulates a substrate against heat, depending on composition;

a "carbon source" is an organic compound which, due to incomplete combustion, leaves behind a carbon skeleton and is burned incompletely to carbon dioxide and water (carbonization); these compounds are also known as "carbon-skeleton-forming substances";

an "acid former" is a compound which, under the effect of heat, i.e. above approximately 150° C., forms a non-volatile acid, for example due to decomposition, and thereby acts as a catalyst for carbonization; in addition, it may contribute to lowering the viscosity of the melt of binder; the term "dehydrogenation catalyst" is used synonymously in this context;

a "blowing agent" is a compound that decomposes at elevated temperature with evolution of inert, i.e. non-combustible gases and optionally expands the softened binder into a foam (intumescence); this term is used synonymously with "gas builder";

an "ash-crust stabilizer" is a so-called skeleton-forming compound, which stabilizes the carbon skeleton (ash crust) formed by the interaction of carbon formation from the carbon source and the gas from the blowing agent or by physical intumescence. In this connection, the mode of action is in principle that the inherently very soft carbon layers being formed are mechanically strengthened by inorganic compounds. The addition of such an ash-crust stabilizer contributes to substantial stabilization of the intumescent crust in the fire situation, since these additives increase the mechanical strength of the intumescent layer and/or prevent it from dripping;

a "multi-component system" is a system or container, such as a package, pail or cartridge, that comprises several components stored separately from one another, so that all ingredients of the fire-protection composition are mixed only during discharge or after discharge; the term "multiple components" means that two or more components are present; in a preferred embodiment, the multi-component system is a two-component system having two separate components;

"liquid" in connection with the term "liquid carbon source" means that the organic compound is a liquid at 25° C. and atmospheric pressure; the liquid generally has a viscosity between 0.0001 and 50,000 Pa·s, wherein the manufacturer's instructions are to be relied upon for the viscosity "a", "an", "any", as the indefinite article preceding a class of chemical compounds, i.e. preceding a word such as "alkoxyfunctional polyether", means that at least one, i.e. one or more compounds included under this class of chemical compounds, e.g. various alkoxysilane-functional polyethers, may be intended;

"at least one" means numerically "one or more"; in a preferred embodiment, "a", "an", "any" is meant numerically with this term;

"contain" and "comprise" mean that still further ingredients may be present in addition to those mentioned. These terms are intended to be inclusive and therefore encompass "consist of". "Consist of" is intended conclusively and means that no further ingredients may be present. In a preferred embodiment, the terms "contain" and "comprise" mean the term "consist of";

a range limited by numbers, e.g. "5 to 60 wt %", means that the two extreme values and any value within this range are disclosed individually.

All standards cited in this text (e.g. DIN standards) were used in the version that was current on the date of filing of this Application.

A first subject matter of the invention is a fire-protection composition. A second subject matter of the invention is a multi-component system that contains the fire-protection composition. A third subject matter of the invention is the use both of the fire-protection composition and of the multi-component system.

The inventive fire-protection composition comprises
an alkoxysilane-functional polymer, which contains, as terminal groups and/or as side groups along the polymer chain, alkoxy-functional silane groups of the general formula (I)

wherein $R^1$ stands for a linear or branched $C_1$-$C_{16}$ alkyl moiety, $R^2$ for a linear or branched $C_1$-$C_6$ alkyl moiety, and m for a whole number from 0 to 2, a dehydrogenation catalyst,
a liquid carbon source, and
optionally a blowing agent,
wherein the alkoxysilane-functional polymer is separated from the liquid carbon source to ensure inhibition of reaction, According to the invention, a polymer is a molecule with six or more repeating units, which may have a structure that can be linear, branched, star-shaped, coiled, hyperbranched or cross-linked. Polymers may contain a single type of repeating units ("homopolymers") or they may contain more than one type of repeating units ("copolymers"). As used herein, the term "polymer" comprises both prepolymers, which may also include oligomers with 2 to 5 repeating units, such as the alkoxysilane-functional compounds being used, which react with one another in the presence of water with formation of Si—O—Si bonds, and also the polymeric compounds formed by the reaction just mentioned.

According to the invention, the alkoxysilane-functional polymer comprises a basic backbone, which is selected from the group consisting of a polyether, polyester, polyether ester, polyamide, polyurethane, polyester urethane, polyether urethane, polyether ester urethane, polyamide urethane, polyurea, polyamine, polycarbonate, polyvinyl ester, polyacrylate, polyolefin such as polyethylene or polypropylene, polyisobutylene, polysulfide, rubber, neoprene, phenol resin, epoxy resin and melamine. This basic backbone may have linear or branched structure (linear basic backbone with side chains along the chain of the basic backbone), and may contain terminal alkoxy-functional silane groups, i.e. as end groups of a linear basic backbone or as end groups of the linear basic backbone and as end groups of the side groups, preferably at least two alkoxy-functional silane groups.

The alkoxy-functional silane group has the general formula (I)

$$—Si(R^1)_m(OR^2)_{3-m} \qquad (I),$$

wherein $R^1$ stands for a linear or branched $C_1$-$C_{16}$ alkyl moiety, preferably for a methyl or ethyl moiety, $R^2$ for a linear or branched $C_1$-$C_6$ alkyl moiety, preferably for a methyl or ethyl moiety, and m for a whole number from 0 to 2, preferably 0 or 1. Most preferably, the at least two alkoxy-functional silane groups are difunctional (m=1) or trifunctional (m=0), and the alkoxy group is a methoxy or ethoxy group.

The alkoxy-functional silane group is bound to the basic backbone of the polymer via a linker group. This may be a so-called α-silane (activated by the α-effect) or a γ-silane or another type of silane.

Preferably the alkoxysilane-functional polymer is an alkoxysilane-functional polyether or an alkoxysilane-functional polyurethane. The most preferred alkoxysilane-functional polymers are polymers in which the basic backbone is terminated via a urethane group containing silane groups, such as, for example dimethoxy(methyl)silylmethyl carbamate-terminated polyether, diethoxy(methyl)silylmethyl carbamate-terminated polyether, trimethoxysilylmethyl carbamate-terminated polyether, triethoxysilylmethyl carbamate-terminated polyether, or mixtures thereof.

Examples of suitable polyethers and polyurethanes comprise silane-terminated polyethers (e.g. Geniosil® STP-E 10, Geniosil® STP-E 15, Geniosil® STP-E 30, Geniosil® STP-E 35, Geniosil® XB 502, Geniosil® WP 1 of Wacker Chemie AG, Polymer ST61, Polymer ST75 and Polymer ST77 of Evonik Hanse) and silane-terminated polyurethanes (Desmoseal® S XP 2458, Desmoseal® S XP 2636, Desmoseal® S XP 2749, Desmoseal® S XP 2821 of Bayer, SPUR+*1050MM, SPUR+*1015LM, SPUR+*3100HM, SPUR+*3200HM of Momentive), or SAX015, SAX350, S203H, S303H, or SAX400 of Kaneka.

The viscosity of these alkoxysilane-functional polyethers and polyurethanes preferably ranges between 0.1 and 50,000 Pa·s, more preferably between 0.5 and 35,000 Pa·s and most preferably between 0.5 and 30,000 Pa·s. The manufacturer's instructions are decisive for these viscosities.

As alternative polymers, especially polyethers or polyurethanes, such in which the alkoxyfunctional silane groups are incorporated not terminally in the skeleton of the polyether or polyurethane, but are selectively distributed in side positions over the chain of the basic backbone, may be preferably used. Important properties, such as the cross-linking density, may be controlled via the incorporated multiple cross-linking units. Suitable examples that may be mentioned here are the TEGOPAC® product line of Evonik Goldschmidt GmbH, such as TEGOPAC BOND 150, TEGOPAC BOND 250 and TEGOPAC SEAL 100. In this connection, reference is made, for example, to DE 102008000360 A1, DE 102009028640 A1, DE102010038768 A1 and DE 102010038774 A1.

Depending on chain length of the basic backbone, alkoxy functionality of the polymer, especially of the polyether or polyurethane, and position of the alkoxy-functional silane groups, the degree of cross-linking of the binder and thus both the strength of the resulting coating and its elastic properties may be adjusted.

Usually the proportion of binder amounts to 5 to 60 wt %, preferably 5 to 50 wt %, more preferably 10 to 40 wt %, respectively relative to the composition.

According to the invention, the composition contains ingredients that, due to the formation of an expanded, insulating layer of flame-retardant material formed under the effect of heat, they protect the substrate from overheating and thereby prevent or at least delay the change of the mechanical and static properties of load-bearing building parts under the effect of heat. The formation of a voluminous insulating layer, namely an ash layer, may take place due to the chemical reaction of a mixture of compounds that are appropriately matched to one another and that react with one another under the effect of heat. Such systems are known to the person skilled in the art by the term chemical intumescence.

In general, at least three components are required for the formation of an intumescent layer by chemical intumescence: a carbon source, a dehydrogenation catalyst and a blowing agent. Under the effect of heat, the binder softens and the fire-protection additives are released, so that they are able react with one another in the case of chemical intumescence or to expand in the case of physical intumescence. From the dehydrogenation catalyst, the acid that functions as catalyst for the carbonization of the carbon source is formed by thermal decomposition. At the same time, the blowing agent decomposes thermally with formation of inert gases, which bring about expansion of the carbonized material, as does optionally the softened binder, with formation of a voluminous, insulating foam.

According to the invention, therefore, the fire-protection composition contains at least one liquid carbon source, at least one acid former and optionally at least one blowing agent.

According to the invention, the liquid carbon source is kept separate from the binder, i.e. the alkoxysilane-functional polymer, so that the binder and the carbon source do not come in contact with one another and cannot react with one another during storage, but instead are able to come in contact with one another only shortly before or during use of the fire-protection composition. The liquid carbon source may constitute the single ingredient of the second component.

The liquid compounds commonly used in intumescent formulations and known to the person skilled in the art, such as polyols, polyether-polyols, polyester-polyols, glycerol-based polyols and mixtures of these polyols may be considered as the liquid carbon source. Liquid epoxy compounds are also conceivable.

Suitable polyols are composed of a basic backbone of polyester, polyether, polyurethane and/or alkanes or mixtures thereof with more than one hydroxyl group. The basic backbone may have linear, branched or cyclic structure and the functional hydroxyl groups may be contained terminally and/or along the chain.

Among these it is possible to mention polyester polyols, which are selected from condensation products of di- and polycarboxylic acids, e.g. aromatic acids such as phthalic acid and isophthalic acid, aliphatic acids such as adipic acid and maleic acid, cycloaliphatic acids such as tetrahydrophthalic acid and hexahydrophthalic acid and/or their derivatives, such as anhydrides, esters or chlorides, and an excess quantity of multifunctional alcohols, e.g. aliphatic alcohols such as ethanediol, 1,2-propanediol, 1,6-hexanediol, neopentyl glycol, glycerol, trimethylolpropane and cycloaliphatic alcohols such as 1,4-cyclohexanedimethanol.

Furthermore, it is possible to mention such polyester polyols that are selected from among polyacrylate polyols, such as copolymers of esters of acrylic and/or methacrylic acid, such as, for example, ethyl acrylate, butyl acrylate, methyl methacrylate with additional hydroxy groups, and styrene, vinyl esters and maleic acid esters. The hydroxyl groups in these polymers are introduced via functional esters of acrylic and methacrylic acid, e.g. hydroxyethyl acrylate, hydroxyethyl methacrylate and/or hydroxypropyl methacrylate.

Furthermore, it is possible to mention such polyester polyols that are selected from among polycarbonate polyols. Usable polycarbonate polyols are polycarbonates containing hydroxyl groups, for example polycarbonate diols. These are obtainable by reaction of carbonic acids or carbonic acid derivatives with polyols or by the copolymerization, with $CO_2$, of alkylene oxides, such as, for example, propylene oxide. Additionally or alternatively, the polycarbonates being used are composed of linear aliphatic chains. Examples of suitable carbonic acid derivatives are carbonic acid diesters, such as, for example, diphenyl carbonate, dimethyl carbonate or phosgene. Examples of suitable polyols are diols, such as ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentanediol-1,3, dipropylene glycol, polypropylene glycols, dibutylene glycol, polybutylene glycols, bisphenol A and lactone-modified diols of the foregoing types Instead of or in addition to pure polycarbonate diols, polyether polycarbonate diols may also be used.

Furthermore, the polyester polyols are selected from among polycaprolactone polyols, synthesized by ring-opening polymerization of ε-caprolactone with multifunctional alcohols, such as ethylene glycol, 1,2-propanediol, glycerol and trimethylolpropane.

Furthermore, it is possible to mention liquid polyether polyols, from addition products, known in themselves, of styrene oxide, ethylene oxide, propylene oxide, butylene oxide and/or epichlorohydrin, to di- or polyfunctional starter molecules. As suitable starter molecules, it is possible to use all compounds known according to the prior art, such as, for example, water, butyl diglycol, glycerol, diethylene glycol, trimethylolpropane, propylene glycol, sorbitol, ethylenediamine, triethanolamine, 1,4-butanediol, diethylene glycol and butyl diglycol.

Liquid polyether polyols that are likewise suitable are also biogenic polyols such as ethereal oils with several hydroxy groups, castor oil derivatives, plant oils converted to polyols by epoxidation and ring opening or by transesterification with glycerol, for example, polyols on the basis of soyabean, rapeseed or sunflower-seed oil, and also polyols synthesized from lignin.

Moreover, it is possible to mention polyurethane polyols synthesized from polyaddition of diisocyanates with excess quantities of diols and/or polyols.

Difunctional or multifunctional alcohols selected from $C_2$-$C_{10}$ alcohols with the hydroxyl groups at the ends and/or along the chain are preferred. Examples of these are ethylene glycol, 1,2- and 1,3-propanediol, 1,2,3-propanetriol, butanediols, 2-methyl-1,3-propanediol, 3-methyl-1,3-butanediol, dipropylene glycol, polyethylene glycol, polypropylene glycols, dibutylene glycol, polybutylene glycols, polytetramethylene ether glycol.

Aforesaid polyester polyols, polyether polyols and $C_2$-$C_{10}$ alcohols that are difunctional and/or trifunctional are particularly preferred.

Examples of suitable polyester polyols include: DESMOPHEN® 1100, DESMOPHEN® 1652, DESMOPHEN® 1700, DESMOPHEN® 1800, DESMOPHEN® 670, DESMOPHEN® 800, DESMOPHEN® 850, DESMOPHEN® VP LS 2089, DESMOPHEN® VP LS 2249/1, DESMOPHEN® VP LS 2328, DESMOPHEN® VP LS 2388, DESMOPHEN® XP 2488 (Bayer), K-FLEX XM-360, K-FLEX 188, K-FLEX XM-359, K-FLEX A308 and K-FLEX XM-332 (King Industries).

Examples of suitable commercially available polyether polyols include: ACCLAIM® POLYOL 12200 N, ACCLAIM® POLYOL 18200 N, ACCLAIM® POLYOL 4200, ACCLAIM® POLYOL 6300, ACCLAIM® POLYOL 8200 N, ARCOL® POLYOL 1070, ARCOL® POLYOL 1105 S, DESMOPHEN® 1110 BD, DESMOPHEN® 1111 BD, DESMOPHEN® 1262 BD, DESMOPHEN® 1380 BT, DESMOPHEN® 1381 BT, DESMOPHEN® 1400 BT, DESMOPHEN® 2060 BD, DESMOPHEN® 2061 BD, DESMOPHEN® 2062 BD, DESMOPHEN® 3061 BT, DESMOPHEN® 4011 T, DESMOPHEN® 4028 BD, DESMOPHEN® 4050 E, DESMOPHEN® 5031 BT, DESMOPHEN® 5034 BT and DESMOPHEN® 5035 BT (Bayer) or mixtures of polyester and polyether polyols such as Worlée-Pol 230 (Worlée).

Examples of suitable alkanols include ethanediol, propanediol, propanetriol, butanediol, butanetriol, pentanediol, pentanetriol, hexanediol, hexanetriol, heptanediol, heptanetriol, octanediol, octanteriol, nonanediol, nonanetriol, decanediol and decanetriol.

Suitable liquid polyols are those of the polyols listed in the foregoing that are liquid substances under normal conditions (regulated in DIN 1343).

Examples of suitable commercially available liquid polyols include:

Polyol 3990, Polyol 3610, Polyol 4800 (Perstorp), Acclaim Polyol 12200 N, Acclaim Polyol 18200 N, Acclaim Polyol 4200, Acclaim Polyol 6300, Acclaim Polyol 8200 N (Covestro), Arcol Polyol 1070, Arcol Polyol 1105 S (Covestro), Desmophen 1100, Desmophen 1200, Desmophen 1300 BA, Desmophen 1300 EA, Desmophen 1300 PR 75 X, Desmophen 1300 X, Desmophen 1380 BT, Desmophen 1388 EA, Desmophen 1400 BT, Desmophen 1400 PR 75% MIBK, Desmophen 1652, Desmophen 1700, Desmophen 1800, Desmophen 2060 BD, Desmophen 5035 BT, Desmophen 5168 T, Desmophen 631 MPA, Desmophen 650 MPA, Desmophen 651 MPA, Desmophen 651 MPA/X, Desmophen 670, Desmophen 670 ZW, Desmophen 670 SN, Desmophen 670 BA, Desmophen 680 BA, Desmophen 670 X, Desmophen 690 MPA, Desmophen 775 XP, Desmophen 800, Desmophen 800 EA, Desmophen 800 MPA, Desmophen 850, Desmophen 881 X, Desmophen C 1100, Desmophen C 1200, Desmophen C 3100 XP, Desmophen C 3200 XP, Desmophen C XP 2716, Desmophen NH 1220, Desmophen NH 1420, Desmophen NH 1520, Desmophen NH 1521, Desmophen PL 800, Desmophen PL 817, Desmophen R 12, Desmophen T 1665 SN/IB, Desmophen T 1775 SN, Desmophen T XP 2374, Desmophen VPLS 2089, Desmophen VPLS 2119, Desmophen VPLS 2249/1, Desmophen VPLS 2279/1, Desmophen VPLS 2328, Desmophen VPLS 2388 (Covestro), Hyperlite Polyol 1629, Hyperlite Polyol 1639, Hyperlite Polyol 1650, Hyperlite Polyol 1674 (Covestro), Multranol (Covestro), Sumiphen (Covestro), Ultracel 2009, Ultracel 2016 (Covestro), Lupranol 1000/1, Lupranol 1000/2, Lupranol 1005/1, Lupranol 1100/1, Lupranol 1200, Lupranol 2004/1, Lupranol 2007/1, Lupranol 2043, Lupranol 2048, Lupranol 2090, Lupranol 2092, Lupranol 2095, Lupranol 2070, Lupranol 2072, Lupranol 2074, Lupranol 2005/1/Balance, Lupranol 1002/1, Lupranol 3402, Lupranol 3508/1, Lupranol 4002/1, Lupranol 400571/SC10, Lupranol 4005/1/SC15, Lupranol 4005/1/SC25, Lupranol 4006/1/SC10, Lupranol 4006/1/SC15, Lupranol 4006/1/SC25, Lupranol 4003/1, Lupranol 4010/1/SC15, Lupranol 4010/1/SC25, Lupranol 3300, Lupranol 3422, Lupranol 3422, Lupranol 3423, Lupranol 3423, Lupranol 3424, Lupranol 3504/1, Lupranol 3505/1 (BASF), Lupraphen 1901/1, Lupraphen 2600/2, Lupraphen 2601/1, Lupraphen 2602/1, Lupraphen 2901/1 (BASF), Caradol ED260-02, Caradol ED56-200, Caradol ED28-08, Caradol ED 28-200, Caradol ET36-17, Caradol ET34-08, Caradol ET28-03, Caradol ET48-09, Caradol ET570-02, Caradol ET380-02, Caradol ET250-04, Caradol ET160-01, Caradol EP500-11, Caradol ED260-30, Caradol ED110-30, Caradol ED56-300, Caradol ET380-30, Caradol ET250-30, Caradol ET160-30, ED110-03 (Shell), Voranol 4701, Voranol Voractiv (DOW), Duranol G4672, Duranol T5652 (Asahi Kasei).

So-called polyepoxy liquid resins are suitable as epoxy resin. These have a glass transition temperature that usually lies below 25° C., in contrast to the so-called solid resins, which have a glass transition temperature above 25° C. and can be comminuted to powders capable of being poured at 25° C. These are obtained by known methods, for example from the oxidation of the corresponding olefins or from the reaction of epichlorohydrin with the corresponding polyols, polyphenols or amines. Basic information about and examples of epoxy resins can be found in the "Epoxy Resins" chapter of the Encyclopedia of Polymer Sciences and Technology, Vol. 9, Wiley-Interscience, 2004. Examples of suitable epoxy resins that should be mentioned are reaction products of polyhydroxy compounds, especially multihydric phenols or phenol-aldehyde condensates, with epihalohydrins or their precursors, especially:

a) Reaction products of epichlorohydrin with bisphenol A, F and S;
b) Epoxy novolacs based on phenol or cresol;
c) Aromatic glycidyl amine resins;
d) Epoxy resins without aromatic structural units;

as well as mixtures of two or more of such epoxy resins in any desired ratio and in any desired degree of purity, provided that the resins are liquid.

Suitable compounds are the glycidylization products of:
dihydroxybenzene derivatives such as resorcinol, hydroquinone and pyrocatechol;
further bisphenols or polyphenols such as bis-(4-hydroxy-3-methylphenyl)-methane, 2,2-bis-(4-hydroxy-3-methylphenyl)-propane (bisphenol C), bis-(3,5-dimethyl-4-hydroxyphenyl)-methane, 2,2-bis-(3,5-dimethyl-4-hydroxyphenyl)-propane, 2,2-bis-(3,5-dibromo-4-hydroxyphenyl)-propane, 2,2-bis-(4-hydroxy-3-tert-butylphenyl)-propane, 2,2-bis-(4-hydroxyphenyl)-butane (bisphenol B), 3,3-bis-(4-hydroxyphenyl)-pentane, 3,4-bis-(4-hydroxyphenyl)-hexane, 4,4-bis-(4-hydroxyphenyl)-heptane, 2,4-bis-(4-hydroxyphenyl)-2-methylbutane, 2,4-bis-(3,5-dimethyl-4-hydroxyphenyl)-2-methylbutane, 1,1-bis-(4-hydroxyphenyl)-cyclohexane (bisphenol Z), 1,1-bis-(4-hydroxyphenyl)-3,3,5-trimethylcyclohexane (bisphenol TMC), 1,1-bis-(4-hydroxyphenyl)-1-phenyl-ethane, 1,4-bis[2-(4-hydroxyphenyl)-2-propyl]-benzene (bisphenol P), 1,3-bis-[2-(4-hydroxyphenyl)-2-propyl]-benzene (bisphenol M), 4,4'-dihydroxydiphenyl (DOD), 4,4'-dihydroxybenzophenone, bis-(2-hydroxynaphth-1-yl)-methane, bis-(4-hydroxynaphth-1-yl)-methane, 1,5-dihydroxy-naphthalene, tris-(4-hydroxyphenyl)-methane, 1,1,2,2-tetrakis-(4-hydroxyphenyl)-ethane, bis-(4-hydroxyphenyl)-ether, bis-(4-hydroxyphenyl) sulfone;

condensation products, obtained under acid conditions, of phenols with formaldehyde, such as phenol novolacs or cresol novolacs, also known as bisphenol F novolacs;

aromatic amines, such as aniline, toluidine, 4-aminophenol, 4,4'-methylenediphenyldiamine (MDA), 4,4'-methylenediphenyldi-(N-methyl)-amine, 4,4'-[1,4-phenylene-bis-(1-methyl-ethylidene)]-bisaniline (bisaniline P), 4,4'-[1,3-phenylene-bis-(1-methyl-ethylidene)]-bisaniline (bisaniline M);

as well as mixtures of two or more of such epoxy resins in any desired ratio and in any desired degree of purity.

Further suitable compounds are reaction products of epichlorohydrin with bisphenol A having an epoxy equivalent weight (EEW)≤550 g/val; reaction products of epichlorohydrin with bisphenol F, the simplest representative of the novolacs, having an EEW≤500 g/val; any desired mixtures of these two reaction products, reaction products of any desired mixture of bisphenol A and bisphenol F with epichlorohydrin, epoxy resins such as hydantoin-based epoxy resins or diglycidyl ethers of hydrogenated bisphenol A or bisphenol F, as well as mixtures of two or more of such epoxy resins in any desired ratio and in any desired degree of purity.

Among those, reaction products of epichlorohydrin with bisphenol A having an EEW≤330 g/val; reaction products of epichlorohydrin with bisphenol F, the simplest representative of the novolacs, having an EEW≤330 g/val; any desired mixture of these two reaction products, reaction products of any desired mixture of bisphenol A and bisphenol F with epichlorohydrin having an EEW≤330 g/val, 5,5-dimethyl-1,3-bis(2,3-epoxypropyl)-2,4-imidazolidinedione; 2,2-bis [4-(2,3-epoxypropoxy)-cyclohexyl]propane; as well as mixtures of two or more of such epoxy resins in any desired ratio and in any desired degree of purity are preferred.

Reaction products of epichlorohydrin with bisphenol A having an EEW≤200 g/val, such as, for example, Epilox® A 17-01, Epilox® A 18-00, Epilox® A 19-00, Epilox® A 19-02, Epilox® A 19-03 or Epilox® A 19-04 of Leuna-Harze GmbH, represented by the following formula, in which 0≤n≤0.2;

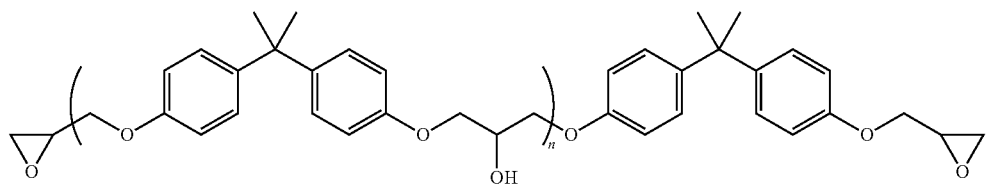

reaction products of epichlorohydrin with bisphenol F, the simplest representative of the novolacs, having an EEW≤185 g/val, such as, for example, Epilox® F 16-01 or Epilox® F 17-00 of Leuna-Harze GmbH, represented by the following formula, in which 0≤n≤0.2;

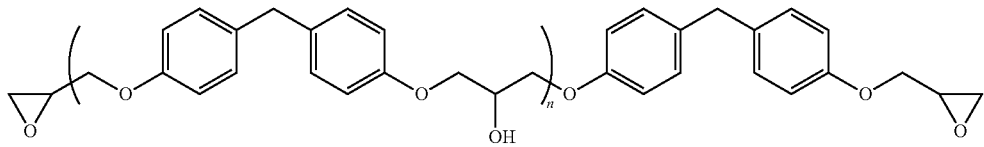

as well as mixtures of two or more of such epoxy resins in any desired ratio and in any desired degree of purity, such as, for example, Epilox® AF 18-30, Epilox® 18-50 or Epilox® T 19-27 of Leuna-Harze GmbH, as well as reaction products of any desired mixture of bisphenol A and bisphenol F with epichlorohydrin having an EEW≤200 g/val are further preferred.

As the epoxy resin, an aliphatic or cycloaliphatic polyepoxide is also suitable, such as, for example:
- a glycidyl ether of a saturated or unsaturated, branched or unbranched, cyclic or open-chain $C_2$ to $C_{30}$ diols, such as, for example, ethylene glycol, propylene glycol, butylene glycol, hexanediol, octanediol, a polypropylene glycol, dimethylol cyclohexane, neopentyl glycol or dibromo-neopentyl glycol,
- a glycidyl ether of a tri- or tetrafunctional, saturated or unsaturated, branched or unbranched, cyclic or open-chain polyol such as castor oil, trimethylolpropane, trimethylolethane, pentaerythritol, sorbitol or glycerol, as well as alkoxylated glycerol or alkoxylated trimethylolpropane;
- a hydrogenated bisphenol A, F or A/F liquid resin, or respectively the glycidylization products of hydrogenated bisphenol A, F or A/F;
- an N-glycidyl derivative of amides or heterocyclic nitrogen bases, such as triglycidyl cyanurate and triglycidyl isocyanurate, as well as reaction products of epichlorohydrin and hydantoin.

Finally, epoxy resins from the oxidation of olefins, for example from the oxidation of vinylcyclohexene, dicyclopentadiene, cyclohexadiene, cyclododecadiene, cyclododecatriene, isoprene, 1,5-hexadiene, butadiene, polybutadiene or divinylbenzene, are also suitable as the epoxy resin.

Besides the liquid carbon sources, still other carbon sources may additionally be used that are not liquid at room temperature (further additional carbon source). The solid compounds are preferably soluble in the liquid carbon sources present according to the invention, so that these together form a homogeneous phase. However, a suspension may also exist.

As further additional carbon sources that are not liquid at room temperature, primarily the solid compounds usually used in intumescent flame-protection agents and known to the person skilled in the art can be considered, such as starch-like compounds, e.g. starch and modified starch, and/or polyhydric alcohols (polyols), such as saccharides and polysaccharides and/or a thermoplastic or thermosetting polymeric resin binder, such as a phenol resin, a urea resin, a polyurethane, polyvinyl chloride, poly(meth)acrylate, polyvinyl acetate, polyvinyl alcohol, a silicone resin and/or a rubber. Suitable polyols are polyols from the group comprising sugar, pentaerythritol, dipentaerythritol, tripentaerythritol, polyvinyl acetate, polyvinyl alcohol, sorbitol, EO-PO-polyols.

The compounds commonly used in intumescent fire-protection formulations and known to the person skilled in the art, such as a salt or an ester of an inorganic, nonvolatile acid selected from among sulfuric acid, phosphoric acid or boric acid, may be considered as the dehydrogenation catalysts or acid formers. Mainly phosphorus-containing compounds, the range of which is very broad, are used, since they extend over several oxidation states of phosphorus, such as phosphines, phosphine oxides, phosphonium compounds, phosphates, elemental red phosphorus, phosphites and phosphates. As examples of phosphoric acid compounds, the following may be mentioned: monoammonium phosphate, diammonium phosphate, ammonium phosphate, ammonium polyphosphate, melamine phosphate, melamine resin phosphates, potassium phosphate, polyol phosphates such as, for example, pentaerythritol phosphate, glycerol phosphate, sorbitol phosphate, mannitol phosphate, dulcitol phosphate, neopentyl glycol phosphate, ethylene glycol phosphate, dipentaerythritol phosphate and the like. Preferably a polyphosphate or an ammonium polyphosphate is used as the phosphoric acid compound. In this connection, compounds such as reaction products of Lamelite C (melamine-formaldehyde resin) with phosphoric acid can be understood as melamine resin phosphates. As examples of sulfuric acid compounds, the following may be mentioned: ammonium sulfate, ammonium sulfamate, nitroaniline bisulfate, 4-nitroaniline-2-sulfonic acid 4,4-dinitrosulfanilamide and the like. As an example of boric acid compounds, melamine borate may be mentioned.

If the fire-protection composition contains a blowing agent, the compounds commonly used in flame-protection compositions and known to the person skilled in the art may be considered, such as cyanuric acid or isocyanuric acid and derivatives thereof, melamine and derivatives thereof. These include cyanamide, dicyanamide, dicyandiamide, guanidine and its salts, biguanide, melamine cyanurate, cyanic acid salts, cyanic acid esters and amides, hexamethoxymethyl melamine, dimelamine pyrophosphate, melamine polyphosphate, melamine phosphate. Preferably hexamethoxymethyl melamine or melamine (cyanuric acid amide) are used.

Furthermore, components that do not restrict their mode of action to a single function are suitable, such as melamine polyphosphate, which acts both as an acid former and as a blowing agent. Further examples are described in GB 2 007 689 A1, EP 139 401 A1 and U.S. Pat. No. 3,969,291 A1.

The insulating-layer-forming additives, i.e. the dehydrogenation catalyst, the liquid carbon source and optionally the blowing agent may be present together in the composition in a proportion of 30 to 99 wt %, wherein the proportion depends substantially on the form of application of the composition (spraying, painting and the like). In order to achieve the highest possible fire resistance, the proportion of the insulating-layer-forming fire-protection additive in the total formulation is adjusted as high as possible. Preferably, its proportion in the total formulation amounts to 35 to 85 wt % and particularly preferably 40 to 85 wt %.

The voluminous, insulating layer formed by chemical intumescence may be supported by physical intumescence. According to the invention, the two systems may be used in combination with one another.

In one embodiment of the invention, in which the insulating layer is additionally formed by physical intumescence, the fire-protection composition further comprises at least one thermally expandable compound, such as a graphite intercalation compound, which is also known as expandable graphite. These may likewise be contained both in the binder, especially homogeneously, and in the liquid carbon source.

Intercalation compounds of $SO_x$, $NO_x$, halogen and/or strong acids in graphite can be considered as examples of expandable graphite. These are also referred to as graphite salts. Expandable graphites that evolve $SO_2$, $SO_3$, NO and/or $NO_2$ while expanding at temperatures of 120 to 350° C., for example, are preferred. As an example, the expandable graphite may be available in the form of lamellas with a maximum diameter in the range of 0.1 to 5 mm. Preferably this diameter lies in the range of 0.5 to 3 mm. Expandable graphites suitable for the present invention are commercially available. In general, the expandable-graphite particles are uniformly distributed in the inventive fire-protection elements. However, the concentration of expandable-graphite particles may also be varied in the manner of spots, patterns, areas and/or sandwiches. In this respect, reference is made to EP 1489136 A1.

Since the ash crust formed in the fire situation is usually too unstable and, depending on its density and structure, it can be blasted by air streams, for example, which negatively influences the insulating effect of the coating, at least one ash-crust stabilizer is preferably added to the components just listed.

In a further embodiment of the invention, the fire-protection composition therefore further comprises at least one inorganic skeleton-forming substance. The components of the additive are preferably selected such that they are able to develop synergy, wherein some of the compounds are able to perform several functions.

The compounds commonly used in fire-protection formulations and known to the person skilled in the art, for example expandable graphite and particulate metals, such as aluminum, magnesium, iron and zinc, may be considered as ash-crust stabilizers or skeleton-forming substances. The particulate metal may exist in the form of a powder, lamellas, flakes, fibers, filaments and/or whiskers, wherein the particulate metal in the form of powder, lamellas or flakes has a particle size of ≤50 µm, preferably of 0.5 to 10 µm. In the case that the particulate metal is used in the form of fibers, filaments and/or whiskers, a thickness of 0.5 to 10 µm and a length of 10 to 50 µm are preferred. Alternatively or additionally, an oxide or a compound of a metal, preferably from the group comprising aluminum, magnesium, iron, titanium or zinc, may be used as the ash-crust stabilizer, especially iron oxide, preferably ferric oxide, titanium dioxide, a borate, such as zinc borate and/or a glass frit of low-melting glasses with a melting temperature of preferably 400° C. or above, phosphate or sulfate glasses, melamine polyzinc sulfates, ferroglasses or calcium borosilicates. The addition of such an ash-crust stabilizer contributes to substantial stabilization of the ash crust in the fire situation, since these additives increase the mechanical strength of the intumescent layer and/or prevent it from dripping. Examples of such additives can also be found in U.S. Pat. Nos. 4,442,157 A, 3,562,197 A, GB 755 551 A and EP 138 546 A1.

Furthermore, fibers such as mineral fibers, carbon fibers or glass fibers, for example, may also be used as ash-crust stabilizers.

In addition, ash-crust stabilizers such as melamine phosphate or melamine borate may be present.

Optionally, one or more reactive flame retardants may be added to the inventive composition. Examples within the meaning of the invention are reactive organophosphorus compounds, such as 9,10-dihydro-9-oxa-10-phosphaphenanthrene-10-oxide (DOPO) and its derivatives and adducts. For example, such compounds are described in S. V. Levchik, E. D. Weil, *Polym. Int.* 2004, 53, 1901-1929 or E. D. Weil, S. V. Levchik (Eds.), Flame Retardants for Plastics and Textiles—Practical Applications, Hanser, 2009.

The inventive fire-protection composition is cured by moisture. Accordingly, curing of the composition begins at the surface.

This type of curing depends on the atmospheric humidity and on the layer thickness. In order to avoid long curing times or to ensure curing in a very dry environment, the inventive fire-protection composition therefore contains, in a preferred embodiment, a cross-linking agent as a further ingredient, wherein water is particularly preferred as the cross-linking agent. Hereby more homogeneous and faster full curing of the binder is achieved, even compared with a composition according to WO 2010/131037 A1. Thus the curing of the composition is largely independent of the absolute atmospheric humidity, and the composition cures reliably and rapidly even under extremely dry conditions.

The water content in the composition may be as high as 5 wt % relative to the polymer, wherein the content is preferably in the range between 0.1 and 5 wt %, more preferably between 0.5 and 3 wt % and even more preferably between 0.6 and 2 wt %.

Further suitable cross-linking agents are a vinyl-functional alkoxysilane, an oligomeric amino-/alkyl-functional alkoxysilane, an oligomeric amino-functional alkoxysilane, an amino-functional alkoxysilane, an aryl-functional alkoxysilane, an epoxy-functional alkoxysilane, a vinyl-functional alkoxysilane, a vinyl-/alkyl-functional alkoxysilane, a mercapto-functional alkoxysilane, a methacryl-functional alkoxysilane or a silicic acid ester.

Examples of those are methyltrimethoxysilane, chloromethyltrimethoxysilane, ethyltrimethoxysilane, propyltrimethoxysilane, vinyltrimethoxysilane, methyltriethoxysilane, vinyltriethoxysilane, phenyltriethoxysilane, methyltripropoxysilane, phenyltripropoxysilane, tetramethoxysilane, tetraethoxysilane, tetra-n-propoxysilane, tetra-n-butoxysilane, methyltris(methylethylketoxime)silane, phenyltris(methylethylketoxime)silane, vinyltris(methylethylketoxime)silane, methyltris(methylisobutylketoxime)silane, methyltris(methylpropylketoxime)silane or tetra(methylethylketoxime)silane,
aminopropyltrimethoxysilane, aminopropyltriethoxysilane, aminopropylmethyldimethoxysilane, aminopropylmethyldiethoxysilane, N-(2-aminoethyl)-aminopropyltrimethoxysilane, N-(2-aminoethyl)-aminopropyltrimethoxysilane, N-(2-aminoethyl)-aminopropyltriethoxysilane, N-(2-aminoethyl)-aminopropyl-methyldimethoxysilane, N-cyclohexylaminomethyltriethoxysilane, N-cyclohexylaminomethyl-methyldiethoxysilane, N-cyclohexylaminomethyl-methyldiethoxysilane, N-cyclohexylaminomethyl-methyldimethoxysilane, hexadecyltrimethoxysilane, iso-butyltriethoxysilane, iso-butyltrimethoxysilane, octyltrichlorosilane, octyltriethoxysilane, propyltriethoxysilane, bis(3-triethoxysilylpropyl)amine, bis(3-trimethoxysilylpropyl)amine, 2-aminoethyl-3-aminopropylmethyldimethoxysilane, 2-aminoethyl-3-amino-propyltrimethoxysilane, 3-glycidyloxypropyltriethoxysilane, 3-glycidyloxypropyltrimethoxysilane, 3-mercaptopropyltrimethoxysilane, 3-methacryloxypropyltrimethoxysilane, methacryloxymethyl-methyldimethoxysilane, methacryloxymethyltrimethoxysilane, 3-methacryloxypropyltriacetoxysilane, ethyl polysilicate, tetraethyl orthosilicate, tetramethyl orthosilicate, tetra-n-propyl orthosilicate, vinyltrichlorosilane, vinyltriacetoxysilane, vinyltris(2-methoxyethoxy)silane, cyclohexyl-3-aminopropyltrimethoxysilane. N-(2-aminoethyl)-3-aminopropyltrimethoxysilane, 3-(2-aminomethylamino)propyltriethoxysilane, N-(2-aminoethyl)-3-aminopropylmethyldimethoxysilane, 3-ureidopropyltrimethoxysilane, N-methyl[3-(trimethoxysilyl)propyl]carbamate, N-trimethoxysilylmethyl-O-methylcarbamate, N-dimethoxy(methyl)silyl-methyl-O-methylcarbamate, tris-[3-(trimethoxysilyl)propyl]-isocyanurate or combinations thereof.

Commercially available examples of those are: Dynasylan® 1146, Dynasylan® 6490, Dynasylan® 6498, Dynasylan® SIVO 210, Dynasylan® SIVO 214, Dynasylan® 9116, Dynasylan® IBTEO, Dynasylan® IBTMO, Dynasylan® MTES, Dynasylan® MTMS, Dynasylan® OCTCS, Dynasylan® OCTEO, Dynasylan® OCTMO, Dynasylan® PTEO, Dynasylan® PTMO, Dynasylan® 1122, Dynasylan® 1124, Dynasylan® 1133, Dynasylan® 1204, Dynasylan® 1505, Dynasylan® 1506, Dynasylan® AMEO, Dynasylan® AMEO-T, Dynasylan® AMMO, Dynasylan® 1411, Dynasylan® DAMO, Dynasylan® DAMO-T, Dynasylan® GLYEO, Dynasylan® GLYMO, Dynasylan® MTMO, Dynasylan® MEMO, Dynasylan® 40, Dynasylan® A, Dynasylan® M, Dynasylan® P, Dynasylan® VTC, Dynasylan® VTEO, Dynasylan® VTMO, Dynasylan® VTMOEO, Dynasylan® 6598 (respectively of Evonik Industries AG), Geniosil® GF9, Geniosil® GF 91, Geniosil® GF 92, Geniosil® XL 926, Geniosil® GF 93, Geniosil® GF 94, Geniosil® GF 95, Geniosil® GF 96, Geniosil® GF 98, Geniosil® XL 10, Geniosil® XL 12, Geniosil® GF 56, Geniosil® GF 62, Geniosil® GF 31, Geniosil® XL 32, Geniosil® XL 33, Geniosil® GF 39, Geniosil® GF 60, Geniosil® XL 63, Geniosil® XL 65, Geniosil® GF 69, Geniosil® GF 80 and Geniosil® GF 82 (respectively of Wacker Chemie AG).

Cross-linking agents are preferably present in a proportion of 0.05 to 5.0 wt %, more preferably 0.1 to 3.0 wt % and most preferably 0.5 to 2.0 wt %, relative to the total composition.

Due to the cross-linking agent, various properties, such as adhesion to the underlying surface and better wetting of the additives as well as improved curing rate of the composition can be selectively optimized and tailored to the situation.

Furthermore, the cross-linking agent may already be present in partly or completely hydrolyzed form. By virtue of the greatly increased reactivity of partly or completely hydrolyzed silanes, their use may be advantageous as cross-linking agents. In this connection, it is known to the person skilled in the art that, during use of partly or completely hydrolyzed silanes, the formation of oligomeric siloxanes is possible, especially of dimers and/or trimers formed by condensation of hydrolyzed silanes.

Examples of particularly preferred oligomeric siloxanes are hexamethoxydisiloxane, hexaethoxydisiloxane, hexa-n-propoxydisiloxane, hexa-n-butoxydisiloxane, octaethoxytrisiloxane, octa-n-butoxytrisiloxane, decaethoxytetrasiloxane.

Obviously any desired mixtures of the silanes mentioned in the foregoing may also be used as cross-linking agents for the organopolysiloxanes.

In a preferred embodiment, the fire-protection composition contains one or more co-cross-linking agents as further ingredients. This co-cross-linking agent may be selected from the group of cross-linking agents as described hereinabove or from water, wherein water is particularly preferred as co-cross-linking agent. Hereby more homogeneous and faster full curing of the binder may be achieved. Thus the curing of the composition is largely independent of the absolute atmospheric humidity, and the composition cures reliably and rapidly even under extremely dry conditions.

The content of co-cross-linking agent, preferably water, in the composition may be as high as 5 wt % relative to the polymer, wherein the content is preferably in the range between 0.1 and 5 wt %, more preferably between 0.5 and 3 wt % and even more preferably between 0.6 and 2 wt %.

In one embodiment, the inventive fire-protection composition further contains at least one further ingredient, selected from among plasticizers, water scavengers, organic and/or inorganic aggregates and/or further additives.

Suitable plasticizers are selected from among derivatives of benzoic acid, phthalic acid, e.g. phthalates, such as dibutyl-, dioctyl-, dicyclohexyl-, diisooctyl-, diisodecyl-, dibenzyl- or butylbenzyl phthalate, trimellitic acid, pyromellitic acid, adipic acid, sebacic acid, fumaric acid, maleic acid, itaconic acid, caprylic acid and citric acid, alkylphosphate esters and derivatives of polyesters and polyethers, epoxidized oils, $C_{10}$-$C_{21}$ alkylsulfonic acid esters of phenols, polyesters, obtainable from linear or branched, saturated or unsaturated $C_6$-$C_{21}$ monocarboxylic acids and multifunctional alcohols or their ethoxylated derivatives, and alicyclic carboxylic acid esters. Preferably the plasticizer is an ester derivative of terephthalic acid, a triol ester of caprylic acid, a glycol diester, diol ester of aliphatic dicarboxylic acids, ester derivative of citric acid, secondary alkylsulfonic acid ester, ester derivatives of glycerol with epoxy groups and ester derivatives of phosphates. Most preferably, the plasticizer is bis(2-ethylhexyl) terephthalate, trihydroxymethylpropylcaprylate, triethylene glycol-bis(2-ethylhexanoate), 1,2-cyclohexanedicarboxylic acid diisononyl ester, a mixture of 75-85% secondary alkylsulfonic acid esters, 15-25% secondary alkanedisulfonic acid diphenyl esters as well as 2-3% non-sulfonated alkanes, triethyl citrate, epoxidized soya bean oil, tri-2-ethylhexyl phosphate or a mixture of n-octyl- and n-decyl succinate.

Commercially available examples of plasticizers are Eastman® DOTP Plasticizer (Eastman Chemical Company), Esterex® NP 343 (Exxon Mobil Corporation), Solusolv®2075 (Solutia Inc.), Hexamoll® DINCH (BASF SE), Mesamoll® II (Lanxess Deutschland GmbH), triethyl citrate (Sigma Aldrich), Paraplex® G-60 (Hallstar Company), Disflammoll® TOF (Lanxess Deutschland GmbH) and Uniplex® LXS TP ODS (Lanxess Deutschland GmbH).

Within the composition, the plasticizer may be present preferably in a proportion of 0.1 to 40 wt %, more preferably 1 to 35 wt % and even more preferably 5 to 25 wt %, relative to the total composition.

In order to prevent a premature reaction of the alkoxysilane-functional polymer with residual moisture of ingredients optionally contained in the composition, especially fillers and/or additives, or with the atmospheric humidity, usually water scavengers are added to the composition, wherein the water scavenger is stored together with the alkoxysilane-functional polymer. Thereby the moisture introduced into the formulations, especially the polymer component, is scavenged. It is not necessary for the liquid carbon source to contain a water scavenger, i.e. for the component that contains the liquid carbon source to additionally contain a water scavenger.

Preferably, the water scavenger is an organofunctional alkoxysilane or an oligomeric organofunctional alkoxysilane, more preferably a vinyl-functional alkoxysilane, an oligomeric vinyl-functional alkoxysilane, a vinyl-/alkyl-functional alkoxysilane, an oligomeric amino-/alkyl-functional alkoxysilane, an acetoxy-/alkyl-functional alkoxysilane, an amino-functional alkoxysilane, an oligomeric amino-functional alkoxysilane, a carbamatosilane or a methacryloxy-functional alkoxysilane. Most preferably, the water scavenger is di-tert-butoxydiacetoxysilane, bis(3-triethoxysilylpropyl)amine, bis(3-trimethoxypropyl)amine, 3-aminopropylmethyldiethoxysilane, 3-aminopropyltriethoxysilane, vinyltriethoxysilane, vinyltrimethoxysilane, vinyltris(2-methoxyethoxy)silane, N-cyclohexylaminomethyltriethoxysilane, vinyldimethoxymethylsilane, vinyltriacetoxysilane, 3-methacryloxypropyltrimethoxysilane, methacryloxymethyl-methyldimethoxysilane, methacryloxymethyltrimethoxysilane, 3-methacryloxypropyltriacetoxysilane, N-methyl[3-(trimethoxysilyl)propyl]carbamate, N-trimethoxysilylmethyl-O-methylcarbamate, N-dimethoxy(methyl)silyl-methyl-O-methylcarbamate or combinations thereof.

Commercially available examples of these are: Dynasylan® 1146, Dynasylan® 6490, Dynasylan® 6498, Dynasylan® BDAC, Dynasylan® 1122, Dynasylan® 1124, Dynasylan® 1133, Dynasylan® 1204, Dynasylan® 1505, Dynasylan® 1506, Dynasylan® AMEO, Dynasylan® AMEO-T, Dynasylan® VTEO, Dynasylan® VTMO, Dynasylan® VTMOEO, Dynasylan® 6598 (respectively of Evonik Industries AG), Geniosil® XL 926, Geniosil® XL 10, Geniosil® XL 12, Geniosil® GF 56, Geniosil® GF 62, Geniosil® GF 31, Geniosil® XL 32, Geniosil® XL 33, Geniosil® GF 39, Geniosil® GF 60, Geniosil® XL 63 and Geniosil® XL 65 (respectively of Wacker Chemie AG).

The added proportion of water scavenger is guided by the water content of the ingredients of the formulation, and it usually lies in the range of approximately 1 wt %. The water scavengers may be present in a proportion of 0.1 to 2 wt %, preferably 0.2 to 2 wt %, more preferably 0.2 to 1.8 wt %, and even more preferably 0.25 to 1.5 wt % relative to the total composition.

Besides the already described additives, the composition may optionally contain common auxiliary agents, such as wetting agents, for example on the basis of polyacrylates and/or polyphosphates, anti-foaming agents, such as silicone anti-foaming agents, dyes, fungicides, or diverse fillers, such as vermiculite, inorganic fibers, silica sand, glass microbeads, mica, silicon dioxide, mineral wool and the like.

Further additives such as thickeners and/or rheology additives and fillers may be included in the composition. Preferably polyhydroxycarboxylic acid amides, urea derivatives, salts of unsaturated carboxylic acid esters, alkylammonium salts of acid phosphoric acid derivatives, ketoximes, amine salts of p-toluenesulfonic acid, amine salts of sulfonic acid derivatives as well as aqueous or organic solutions of mixtures of the compounds are used as rheology additives, such as anti-settling agents, anti-sagging agents and thixotropic agents. In addition, rheology additives on the basis of fumed or precipitated silicas or on the basis of silanized fumed or precipitated silicas may be used. Preferably the rheology additive is fumed silicas, modified and non-modified layer silicates, precipitated silicas, cellulose ethers, polysaccharides, PU and acrylate thickeners, urea derivatives, castor oil derivatives, polyamides and fatty acid amides and polyolefins, provided they exist in solid form, pulverized celluloses and/or suspension agents, such as xanthan gum, for example.

Furthermore, the composition may contain at least one catalyst, wherein this, if present, is separated from the alkoxy-functional polymer to ensure inhibition of reaction. Due to the cross-linking agent, various properties, such as adhesion to the underlying surface and better wetting of the additives as well as improved curing rate of the composition can be selectively optimized and tailored to the situation.

All compounds that are suitable for catalyzing the formation of Si—O—Si bonds between the silane groups of the polymer may be used as catalysts. Metal compounds such as titanium compounds and tin compounds may be mentioned as examples. Alternatively, acidic or basic catalysts may be mentioned.

Among the tin compounds, dibutyltin dilaurate, dibutyltin maleate, dibutyltin diacetate, dibutyltin dioctanoate, dibutyltin acetylacetonate, dibutyltin oxide, or corresponding compounds of dioctyltin, such as dioctyltin dilaurate, tin naphthenate, dimethyltin dineodododecanoate, reaction products of dibutyltin oxide and phthalic acid esters are preferred.

Among the basic amines, triethylamine, tributylamine, trioctylamine, monoethanolamine, diethanolamine, triethanolamine, triisopropanolamine, tetramethylenediamine, Quadrol, diethylenetriamine, dimethylaniline, proton sponge, N,N'-bis[2-(dimethylamino)ethyl]-N,N'-dimethylethylenediamine, N,N-dimethylcyclohexylamine, N-dimethylphenylamine, 2-methylpentamethylenediamine, 2-methylpentamethylenediamine, 1,1,3,3-tetramethylguanidine, 1,3-diphenylguanidine, benzamidine, N-ethylmorpholine, 2,4,6-tris(dimethylaminomethyl)phenol (TDMAMP); 1,8-diazabicyclo[5.4.0]undec-7-ene (DBU) and 1,5-diazabicyclo(4.3.0)non-5-ene (DBN); n-pentylamine, n-hexylamine, di-n-propylamine and ethylenediamine; DABCO, DMAP, PMDETA, imidazole and 1-methylimidazole or salts of amines and carboxylic acids and polyether amines, such as polyether monoamines, polyether diamines or polyether triamines, such as, for example, the Jeffamines of Huntsman and ether amines, such as, for example the Jeffcats of Huntsman are preferred. In this respect, reference is made to the Applications WO 2011/157562 A1 and WO 2013/003053 A1.

Among the titanium compounds, titanate esters are preferred, such as tetrabutyl titanate, tetrapropyl titanate, tetraisopropyl titanate, tetraacetylacetonate titanate.

Among the metal compounds as catalysts, it is further possible to mention organoaluminum compounds or reaction products of bismuth salts or chelate compounds, such as zirconium tetraacetylacetonate.

As acidic catalysts, phosphoric acid or phosphoric acid esters, toluenesulfonic acid and mineral acids may be mentioned as examples.

As basic catalysts, solutions of simple bases such as NaOH, KOH, $K_2CO_3$, ammonia, $Na_2CO_3$, aliphatic alcoholates or phenolates may be mentioned as examples.

The type and quantity of catalyst are selected as a function of the selected alkoxysilane-functional polymer and of the desired reactivity.

As mentioned in the introduction, a second subject matter of the invention is a multi-component system that comprises fire-protection composition as described hereinabove, with a first component (A) and a second component (B) separated from the first component, wherein the first component (A) contains the alkoxy-functional polymer and the second component (B) contains the liquid carbon source. The inventive composition is preferably packaged as a two-component system.

As already mentioned, the inventive fire-protection composition comprises at least: one alkoxy-functional polymer, especially an alkoxysilane-functional polyether or an alkoxysilane functional polyurethane, an acid source (dehydrogenation catalyst) and a liquid carbon source. According to the invention, the alkoxysilane-functional polyether or the alkoxysilane-functional polyurethane is spatially separated from the liquid carbon source, in order to prevent a reaction between these two ingredients during storage. The said acid source may be contained in the component that contains the alkoxy-functional polymer, especially the alkoxysilane-functional polyether or the alkoxysilane-functional polyurethane, or may be contained in the component that contains the liquid carbon source.

Depending on their function and/or on their compatibility with one another and with the compounds contained in the composition, the further ingredients optionally contained in the composition are divided and may be contained in one of the two components or in both components.

Furthermore, the division of the further ingredients, especially of the solid ingredients, may depend on the proportions in which they are to be contained in the composition. By appropriate division, it is optionally possible to achieve a higher proportion relative to the total composition.

In a preferred embodiment, the multi-component system is a two-component system, comprising a first component (A), which contains an alkoxysilane-functional polymer and a dehydrogenation catalyst and a second component, which is separated therefrom in a manner that ensures inhibition of reaction and/or is separated spatially, and which contains a liquid carbon source.

In a further preferred embodiment, the two-component system comprises a first component (A), which contains an alkoxysilane-functional polymer, a dehydrogenation catalyst and a blowing agent, and a second component, which is separated therefrom in a manner that ensures inhibition of reaction and/or is separated spatially, and which contains a liquid carbon source.

In an alternative embodiment, the two-component system comprises a first component (A), which contains an alkoxysilane-functional polymer, a dehydrogenation catalyst and a blowing agent, and a second component, which is separated therefrom in a manner that ensures inhibition of reaction and/or is separated spatially, and which contains a liquid carbon source and a solid further carbon source.

In a further preferred embodiment, the two-component system comprises a first component (A), which contains an alkoxysilane-functional polymer, a dehydrogenation catalyst and a blowing agent, and a second component, which is separated therefrom in a manner that ensures inhibition of reaction and/or is separated spatially, and which contains a liquid carbon source and a cross-linking agent.

In a more preferred embodiment, the two-component system comprises a first component (A), which contains an alkoxysilane-functional polymer, a dehydrogenation catalyst, a blowing agent and organic and/or inorganic additives, and a second component, which is separated therefrom in a manner that ensures inhibition of reaction and/or is separated spatially, and which contains a liquid carbon source and a cross-linking agent.

In an even more preferred embodiment, the two-component system comprises a first component (A), which contains an alkoxysilane-functional polyether and/or an alkoxysilane-functional polyurethane, a dehydrogenation catalyst and a blowing agent, and a second component, which is separated therefrom in a manner that ensures inhibition of reaction and/or is separated spatially, and which contains a liquid carbon source and optionally a cross-linking agent.

The composition is applied as a paste with a paintbrush or a roller or by spraying onto the substrate, which may be metallic, plastic in the case of cable runs or soft partitions of mineral wool. Preferably the composition is applied by means of an airless spraying method.

Compared with systems based on solvents and water, the inventive composition is characterized by relatively rapid curing due to a condensation reaction and thus not by the need for physical drying. This is very important especially when the coated building parts must be rapidly loaded or reprocessed, whether this be due to coating with a covering layer or to movement or transportation of the building parts. Thus the coating is also much less susceptible to external influences on the building site, such as, for example, exposure to (rain) water or dust and dirt, which in systems based on solvents or water may lead to leaching of water-soluble ingredients or to reduced effect due to uptake of dust.

Furthermore, in comparison with solvent-based systems, the exposure of people and the environment to volatile organic compounds (VOC) is minimized.

Due to the low viscosity of the composition, i.e. after mixing of the two components, the composition remains easy to process, especially by common spraying methods, despite the high solids proportion.

Due to the packaging as a two-component system, very good storage stability is achieved.

Therefore the inventive fire-protection composition is suitable in particular as a fire-protection coating, especially as a sprayable coating for construction elements, especially for building parts on a metallic and nonmetallic basis. The inventive fire-protection composition is usable above all in the building sector as a coating, especially fire-protection coating for steel construction elements. Nevertheless, a use for coating of individual cables, cable bundles, cable runs and cable ducts or other lines is also conceivable, as is also a use for fire-protection coating of construction elements of materials other than steel, such as concrete or wood.

A third subject matter of the invention is therefore the use of the inventive composition as a coating, especially as a coating for construction elements or building elements of steel, concrete, wood and other materials, such as plastics, for example, especially as a fire-protection coating for individual cables, cable bundles, cable runs and cable ducts or other lines or soft partitions.

The invention will be further explained on the basis of the following examples.

EXAMPLES

For the production of inventive insulating-layer-forming compositions, the individual components are mixed and homogenized by means of a dissolver, as indicated hereinafter. The solids Exolit AP 462 (ammonium polyphosphate microencapsulated with melamine resin, Clariant), Kronos 2056 (titanium dioxide, Kronos International), Melafine (melamine, OCI) and Charmor PM 40 (2,2-bis(hydroxymethyl)-1,3-propanediol, Perstorp), were dried for 18 hours at 110° C. prior to production of the compositions.

The compositions were stored in a manner protected from atmospheric humidity in 80-mL PE beakers at 40° C.

Example 1

| Ingredient of component A | Quantity in [g] |
|---|---|
| Geniosil STP-E 10 [1] | 135.5 |
| Geniosil GF 96 [2] | 6.2 |
| Geniosil XL 10 [3] | 6.1 |
| Exolit AP 462 [4] | 75.1 |
| Kronos 2056 [5] | 37.6 |
| Melafine [6] | 37.4 |

[1] Dimethoxy(methyl)silylmethylcarbamate-terminated polyether, Wacker Chemie AG
[2] 3-Aminopropyltrimethoxysilane, Wacker Chemie AG
[3] Trimethoxyvinylsilane, Wacker Chemie AG
[4] Ammonium polyphosphate microencapsulated with melamine resin, Clariant
[5] Titanium dioxide, Kronos International
[6] Melafin, OCI Melamine

Example 2

| Ingredient | Quantity in [g] |
|---|---|
| KANEKA MS Polymer SAX015 [7] | 135.3 |
| Geniosil GF 96 [2] | 6.2 |
| Geniosil XL 10 [3] | 6.1 |
| Exolit AP 462 [4] | 75.4 |
| Kronos 2056 [5] | 37.6 |
| Melafine [6] | 37.9 |

[7] Silane-terminated polyether, Kaneka Corporation

Example 3

| Ingredient | Quantity in [g] |
|---|---|
| DESMOSEAL S XP 2749 [8] | 135.3 |
| Geniosil GF 96 [2] | 6.5 |
| Geniosil XL 10 [3] | 6.1 |
| Exolit AP 462 [4] | 75.3 |
| Kronos 2056 [5] | 37.9 |
| Melafine [6] | 37.6 |

[8] Aliphatic silane-terminated polyurethane, Covestro AG

Example 4

| Ingredient | Quantity in [g] |
|---|---|
| DESMOSEAL S XP 2749 [8] | 132.5 |
| Geniosil GF 96 [2] | 6.3 |
| Geniosil XL 10 [3] | 6.2 |
| Exolit AP 462 [4] | 75.7 |
| Kronos 2056 [5] | 37.7 |
| Melafine [6] | 37.8 |
| 1,1,3,3-Tetramethylguanidine | 3.35 |

Comparison Example 1

| Ingredient | Quantity in [g] |
|---|---|
| Geniosil STP-E 10 [1] | 131.7 |
| Geniosil GF 96 [2] | 6.1 |
| Geniosil XL 10 [3] | 6.3 |
| Exolit AP 462 [4] | 60.0 |
| Kronos 2056 [5] | 30.1 |
| Melafine [6] | 30.2 |
| Charmor PM 40 [9] | 30.1 |

[9] 2,2-Bis(hydroxymethyl)-1,3-propanediol, Perstorp

Comparison Example 2

| Ingredient | Quantity in [g] |
|---|---|
| DESMOSEAL S XP 2749 [8] | 131.5 |
| Geniosil GF 96 [2] | 6.1 |
| Geniosil XL 10 [3] | 6.4 |
| Exolit AP 462 [4] | 60.3 |
| Kronos 2056 [5] | 30.4 |
| Melafine [6] | 30.7 |
| Charmor PM 40 [9] | 30.6 |

Comparison Example 3

| Ingredient | Quantity in [g] |
|---|---|
| KANEKA MS Polymer SAX015 [7] | 131.51 |
| Geniosil GF 96 [2] | 6.23 |
| Geniosil XL 10 [3] | 6.24 |
| Exolit AP 462 [4] | 59.79 |
| Kronos 2056 [5] | 31.5 |
| Melafine [6] | 30.2 |
| Charmor PM 40 [9] | 30.2 |

Comparison Example 4

| Ingredient | Quantity in [g] |
|---|---|
| DESMOSEAL S XP 2749 [8] | 131.5 |
| Geniosil GF 96 [2] | 6.1 |
| Geniosil XL 10 [3] | 6.2 |
| Exolit AP 462 [4] | 60.2 |
| Kronos 2056 [5] | 30.1 |
| Melafine [6] | 30.0 |
| Charmor PM 40 [9] | 15.0 |
| Polyol 4360 [10] | 15.1 |

[10] Propoxylated 2,2-bis(hydroxymethyl)-1,3-propanediol, Perstorp

Comparison Example 5

| Ingredient | Quantity in [g] |
|---|---|
| Geniosil STP-E 10 [1] | 131.3 |
| Geniosil GF 96 [2] | 6.0 |
| Geniosil XL 10 [3] | 6.2 |
| Exolit AP 462 [4] | 60.4 |
| Kronos 2056 [5] | 30.6 |

-continued

| Ingredient | Quantity in [g] |
|---|---|
| Melafine [6] | 30.1 |
| Charmor PM 40 [9] | 15.2 |
| Polyol 4360 [10] | 15.3 |

Viscosity Measurements

A viscosity curve was plotted with an air-mounted Kinexus Rheometer of Malvern Instruments Ltd., UK. For this purpose, a cone-and-plate system with a diameter of 20 mm and an angle of 1° was used. The measurement temperature was 45° C. and the temperature-stabilization time after sample preparation was 2 minutes. A shear velocity staircase with 14 steps was indicated: 0.1 s; 0.2154/s 0.4642/s; 1/s; 2.154/s; 4.642/s; 10/s; 21.54/s; 46.42/s; 100/s; 215.4/s; 300/s 464.2/s; 500/s. The measuring point duration was 11 s and the integration time was 5 s. The viscosity at 100/s was used for comparison of the samples. The reported values correspond to the mean of two measurements at 100 s$^{-1}$.

TABLE 1

Viscosity of component A of Examples 1 to 4 in Pa · s at 45° C. and 100 s$^{-1}$

|  | 0 days | 8 days | 14 days | 28 days |
|---|---|---|---|---|
| Example 1 | 6.765 | 6.289 | 7.221 | 7.185 |
| Example 2 | 0.356 | 0.489 | 0.459 | 0.54 |
| Example 3 | 2.877 | 3.357 | 3.403 | 3.77 |
| Example 4 | 3.167 | 2.013 | 3.751 | 3.440 |

TABLE 2

Viscosity of Comparison Examples 1 to 5 in Pa · s at 45° C. and 100 s$^{-1}$

|  | 0 days | 8 days | 18 days |
|---|---|---|---|
| Comparison Example 1 | 11.14 | 29.5 | 28.53 |
| Comparison Example 4 | 3.092 | 69.66 | 283.90 |
| Comparison Example 5 | 6.593 | 30.1 | 30.86 |

|  | 0 days | 8 days | 14 days |
|---|---|---|---|
| Comparison Example 2 | 3.955 | 34.815 | 150.35 |
| Comparison Example 3 | 0.520 | 2.078 | 3.688 |

As the data in Tables 1 and 2 clearly show, the viscosity of the mixtures of Examples 1 to 4, in which no carbon source and thus no hydroxyl-group-containing or supplying compounds is contained in the polymer component, increases only negligibly over the storage duration. In comparison with this, the viscosity of the mixtures of Comparison Examples 1 to 5, in which a carbon source and thus a hydroxyl-group-containing or supplying compound is contained in the polymer component, increases significantly. This is unambiguous evidence that the storage stability of the mixtures from the comparison examples is much poorer than that of the mixtures from Examples 1 to 4.

The invention claimed is:

1. A fire-protection composition, comprising:
   an alkoxysilane-functional polymer, which contains, as terminal groups and/or as side groups along a polymer chain, alkoxy-functional silane groups of the general formula (I)

$$Si(R^1)_m(OR^2)_{3-m}$$ (I), wherein $R^1$ stands for a linear or branched $C_1$-$C_{16}$alkyl moiety, $R^2$ for a linear or branched $C_1$-$C_6$ alkyl moiety, and m for an integer from 0 to 2,
   a dehydrogenation catalyst,
   a liquid carbon source selected from the group consisting of a liquid polyester polyol, and a liquid epoxy compound, and
   optionally a blowing agent,
   wherein the alkoxysilane-functional polymer is separated from the liquid carbon source to ensure inhibition of reaction.

2. The fire-protection composition according to claim 1, wherein the alkoxysilane-functional polymer comprises a basic backbone, which is selected from the group consisting of a polyether, polyester, polyether ester, polyamide, polyurethane, polyester urethane, polyether urethane, polyether ester urethane, polyamide urethane, polyurea, polyamine, polycarbonate, polyvinyl ester, polyacrylate, polyolefin, polyisobutylene, polysulfide, rubber, neoprene, phenol resin, epoxy resin and melamine.

3. The fire-protection composition according to claim 2, wherein the basic backbone of the alkoxysilane-functional polymer is a polyether or a polyurethane.

4. The fire-protection composition according to claim 1, wherein the alkoxysilane-functional polymer carries at least 2 alkoxy functional silane groups.

5. The fire-protection composition according to claim 1, further comprising an additional non-liquid carbon source, which is likewise separated from the alkoxysilane-functional polymer to ensure inhibition of reaction.

6. The fire-protection composition according to claim 1, further comprising at least one cross-linking agent.

7. The fire-protection composition according to claim 6, further comprising a co-cross-linking agent.

8. The fire-protection composition according to claim 7, wherein the co-cross-linking agent is water.

9. The fire-protection composition according to claim 1, further comprising an organic additive.

10. A multi-component system, comprising:
    the fire-protection composition according to claim 1, with a first component (A) and a second component (B) separated from the first component (A), wherein the first component (A) contains an alkoxysilane-functional polyether or an alkoxysilane-functional polyurethane and the second component (B) contains the liquid carbon source selected from the group consisting of a liquid polyester polyol, and a liquid epoxy compound.

11. A method of coating, comprising:
    applying the fire-protection composition according to claim 1 to a surface.

12. The method according to claim 11, comprising applying the composition to coat a construction element.

13. The method according to claim 12, wherein the construction element is a nonmetallic building part.

14. The fire-protection composition according to claim 1, further comprising an inorganic additive.

* * * * *